United States Patent
Fu et al.

(10) Patent No.: US 10,261,201 B2
(45) Date of Patent: Apr. 16, 2019

(54) METHOD FOR IMPROVING TIMING RESOLUTION USING DEPTH OF INTERACTION CORRECTION IN PET DETECTOR

(71) Applicant: General Electric Company, Schenectady, NY (US)

(72) Inventors: Geng Fu, Rexford, NY (US); Floribertus P M Heukensfeldt Jansen, Niskayuna, NY (US); Jianjun Guo, Ballston Spa, NY (US); Sergei Ivanovich Dolinsky, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 15/090,156

(22) Filed: Apr. 4, 2016

(65) Prior Publication Data

US 2017/0285182 A1 Oct. 5, 2017

(51) Int. Cl.
*G01T 1/202* (2006.01)
*G01T 1/29* (2006.01)

(52) U.S. Cl.
CPC .................. *G01T 1/2985* (2013.01)

(58) Field of Classification Search
CPC ..... G01T 1/2985; G01T 1/2018; G01T 1/202; G01T 1/20; G01T 1/00; G01T 1/1612; G01T 1/2002; G06T 2207/10104

(Continued)

(56) References Cited

U.S. PATENT DOCUMENTS 8,319,186 B2 11/2012 Prescher et al.
8,698,087 B2 4/2014 Surti et al.
(Continued)

FOREIGN PATENT DOCUMENTS

WO 2014064295 A1 5/2014
WO 2014135465 A1 9/2014

OTHER PUBLICATIONS

Moses, W. W. et al., "Prospects for Time-of-Flight PET using LSO Scintillator", Nuclear Science, IEEE Transactions on, vol. 46, Issue 3, Jun. 1999, (pp. 474-478, 5 total pages).
(Continued)

*Primary Examiner* — Taeho Jo
(74) *Attorney, Agent, or Firm* — Ernest G. Cusick

(57) ABSTRACT

A method for determining depth-of-interaction correction in a PET system. The method includes modifying crystal and readout configuration to improve depth-dependent arrival profile of scintillation photons, creating a photon dispersion model within a scintillator crystal, measuring photon arrival profile of individual gamma ray event, deriving an estimated depth-of-interaction, and deriving a gamma ray event time based on a time stamp corrected with the estimated depth-of-interaction. The method further includes modeling dispersion at different depths of interaction within the scintillator crystal, providing a reflector layer to delay back-reflected photons, providing two respective readouts for the same gamma ray event from two respective pixels optically coupled by a backside reflector or modified crystal configuration, calculating a time difference of the photon arrival at the two pixels, and estimating the depth-of-interaction by applying a statistical weighting.

19 Claims, 4 Drawing Sheets

(58) Field of Classification Search
USPC .......................................................... 250/362
See application file for complete search history.

(56) References Cited

U.S. PATENT DOCUMENTS

| | | | |
|---|---|---|---|
| 8,750,569 | B2 | 6/2014 | Laurence et al. |
| 8,816,286 | B2 | 8/2014 | Cho |
| 9,029,789 | B2* | 5/2015 | Shibuya ............... G01T 1/2985 250/367 |
| 9,606,245 | B1* | 3/2017 | Czarnecki ............ G01T 1/2006 |
| 2007/0181814 | A1* | 8/2007 | Crosetto ............... G01T 1/1642 250/368 |
| 2009/0159804 | A1* | 6/2009 | Shibuya ............... G01T 1/2985 250/363.03 |
| 2010/0148074 | A1* | 6/2010 | Menge .................. G01T 1/1644 250/362 |
| 2011/0001049 | A1* | 1/2011 | Shibuya ............... G01T 1/2985 250/362 |
| 2012/0068077 | A1 | 3/2012 | Frach et al. |
| 2012/0187081 | A1* | 7/2012 | Philip .................. G01T 1/2002 216/24 |
| 2012/0318988 | A1* | 12/2012 | Taghibakhsh ............ G01T 1/17 250/362 |
| 2013/0032706 | A1* | 2/2013 | Cho ...................... G01T 1/1647 250/252.1 |
| 2014/0110592 | A1 | 4/2014 | Nelson et al. |
| 2015/0144797 | A1 | 5/2015 | Dolinsky et al. |
| 2016/0011321 | A1* | 1/2016 | Solf ........................ G01T 1/171 250/363.03 |
| 2016/0084963 | A1* | 3/2016 | Laurence .............. G01T 1/1644 250/362 |

OTHER PUBLICATIONS

Kim, Chang Lyong et al., "Dependence of Timing Resolution on Crystal Size for TOF PET", Nuclear Science Symposium Conference Record, 2007. NSS '07. IEEE, vol. 4, 2007, (pp. 2875-2879, 5 total pages).

Freeman, "Pixelated crystal cuts DOI PET costs", Medical Physics web, Mar. 19, 2013, 2pgs.

Mandai, S. et al., "A 4 x4 x416 digital SiPM array with 192 TDCs formultiple high-resolution timestamp acquisition", Journal of Instrumentation, vol. 8, Jul. 2013, DOI: 10.1088/1748-0221/8/05/P05024, 14pgs.

Yeom, Jung Yeol et al., "Optimizing timing performance of silicon photomultiplier-based scintillation detectors", Physics in Medicine and Biology, vol. 58, Issue 4, 2013, DOI: 10.1088/0031-9155/58/4/1207, (pp. 1207-1220, 15 total pages).

Gundackeret, S. et al., "Time resolution deterioration with increasing crystal length in a TOF-PET system", Nuclear Instruments and Methods in Physics Research A 737, Feb. 11, 2014, (pp. 92-100, 9 total pages).

Derenzo, Stephen E et al.,"Fundamental limits of scintillation detector timing precision", Physics in Medicine and Biology, vol. 59, Issue 13, 2014, DOI: 1088/0031-9155/59/13/3261, (pp. 3261-3286, 26 total pages).

* cited by examiner

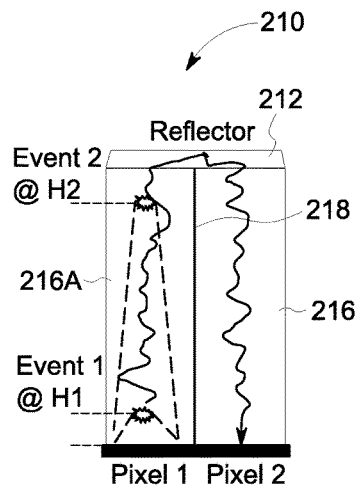
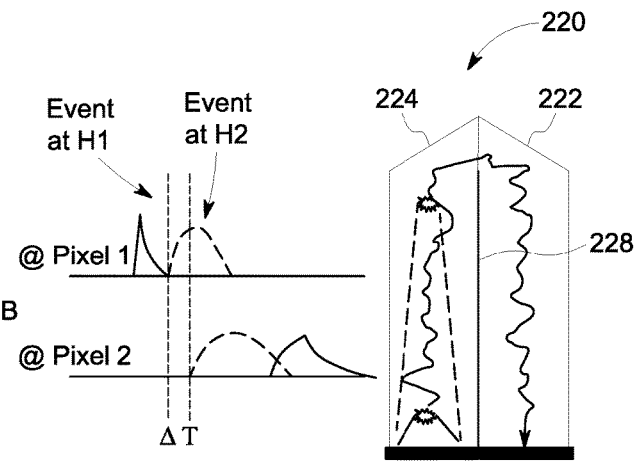
FIG. 2A
FIG. 2B
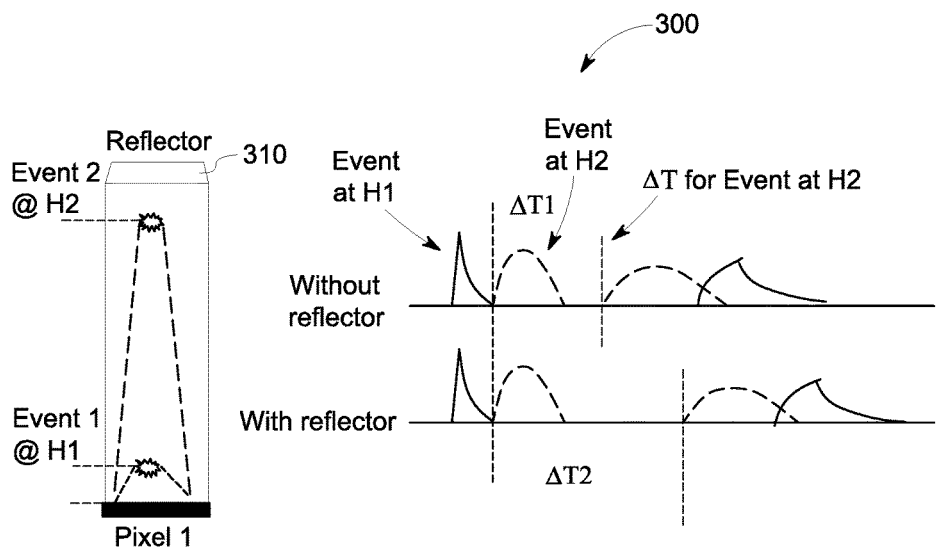
FIG. 3

METHOD FOR IMPROVING TIMING RESOLUTION USING DEPTH OF INTERACTION CORRECTION IN PET DETECTOR

BACKGROUND

For time-of-flight (TOF) positron emission tomography (PET) imaging detectors with good timing resolution are required for improving image quality. One of the effects degrading the timing resolution is the statistical fluctuation of the number of scintillation photons and their transportation inside the crystal.

A depth-of-interaction (DOI) correction is important to achieve sub-250 ps timing resolution in TOF-PET detectors utilizing currently available fast scintillators such as LSO (Lutetium Oxy-orthosilicate) or LYSO (Lutetium Yttrium Oxy-orthosilicate) and fast photosensors. Due to optical photon dispersion (different path lengths) in the scintillator crystal, timing resolution deteriorates with increasing crystal length; at the same time, a long (about 20-30 mm) crystal is needed for good detection efficiency (high stopping power).

Traditionally the DOI correction could be implemented by using a dual-ended readout, and/or using a multiple-layer scintillator. However, the timing resolution is significantly worse for both of these approaches due to lower light collection efficiency. Additionally, the cost associated with a complex electronic logic and detector package (additional scintillator and/or photodetector) has mostly precluded their commercialization for next-generation (<250 ps) clinical PET scanners.

BRIEF DESCRIPTION OF THE DRAWINGS

FIGS. 2A-2B depict pixel structures in accordance with some embodiments;

FIG. 3 depicts an alternative pixel structure in accordance with some embodiments.

DESCRIPTION

In accordance with embodiments, systems and methods measure the arrival profile of detected photons in the first 0.1-0.5 nanoseconds (ns) of a radiation event to derive the event timing. Since the temporal profile of light (scintillation photons) collection in the first 0.1-0.5 ns depends on the gamma ray interaction position and scintillator size, the interaction depth can be estimated based on the measured variation of signal collection (photon arrival) time. For sub-250 ps TOF-PET detectors, the discriminator threshold needs to be set very low to achieve the best timing resolution, while the signal crossing the threshold depends on the light (1-10 photoelectrons) collection in the first 0.1-0.3 ns. One of the effects degrading the timing resolution in long crystals is the depth dependent variation of scintillation photon propagation at the different depths. This introduces additional timing pickoff dispersion when a leading edge discriminator (LED) method is used for timing measurement.

Figure 1A:
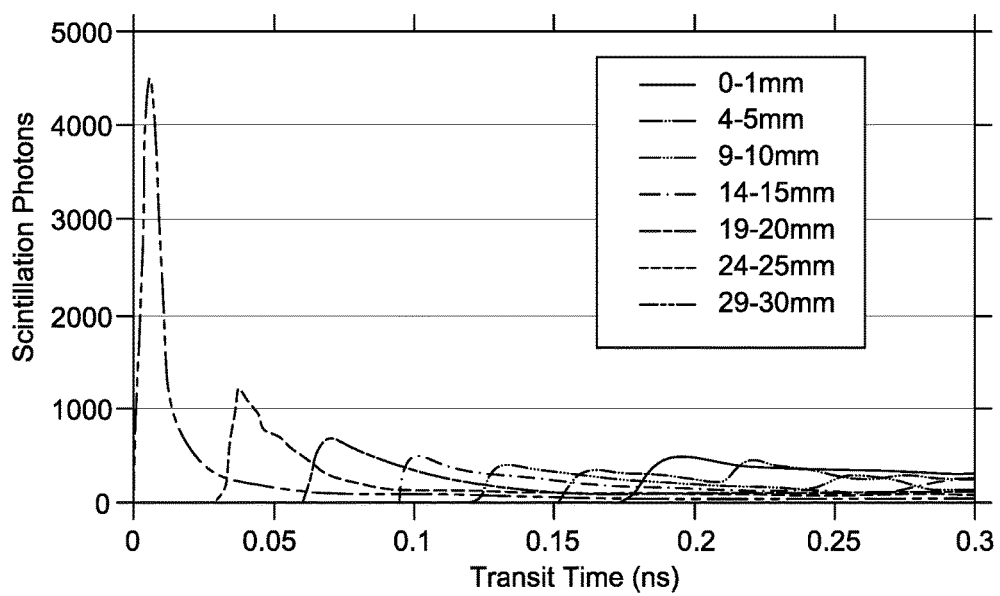
FIGS. 1A-1C graphically depict the relationship between photon arrival profile and interaction position.
Figure 1B:
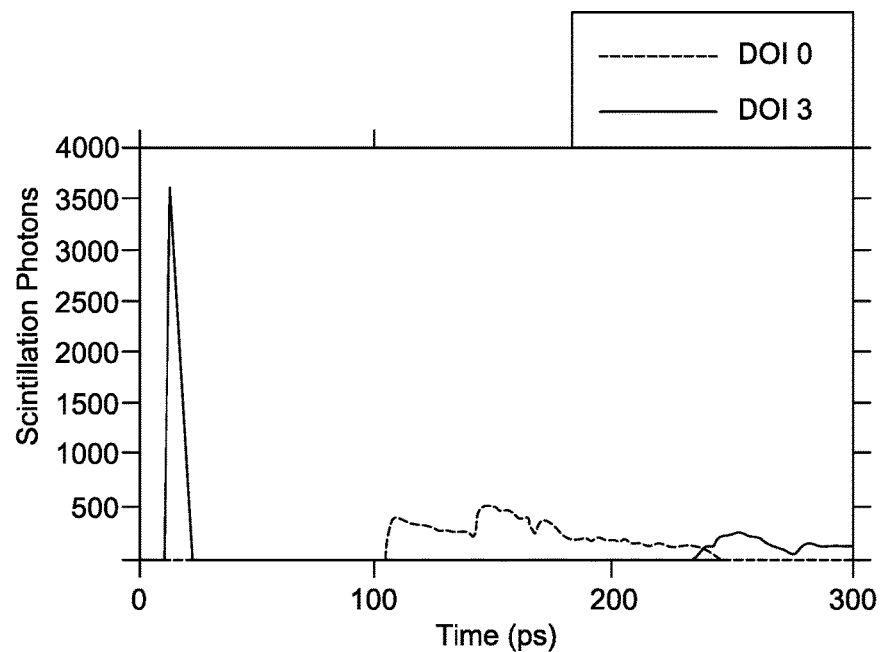
Figure 1C:
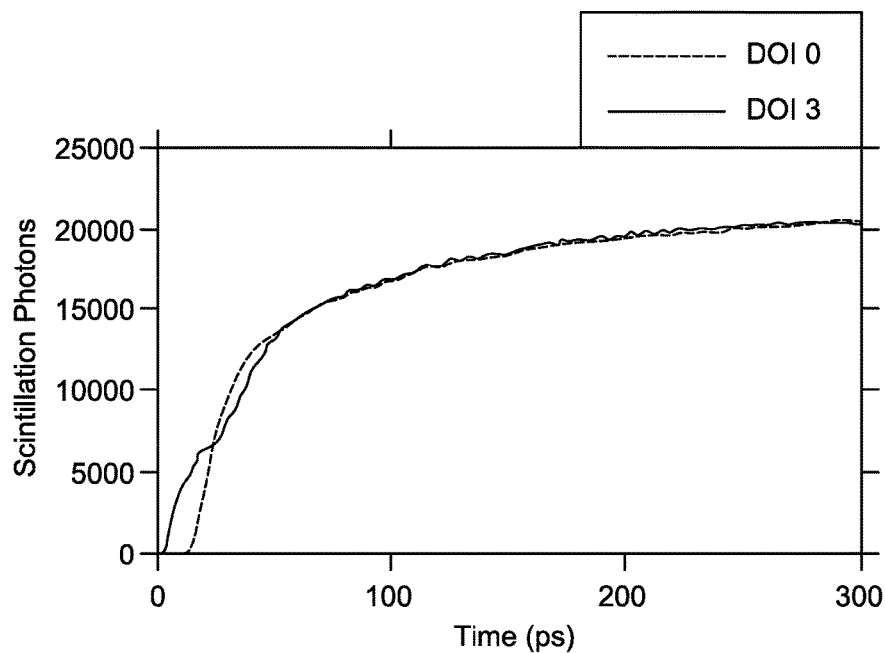

FIGS. 1A-1C depict graphically the relationship between photon arrival profile and interaction position. As depicted in FIGS. 1A-1C, when a gamma ray interaction occurs in the crystal, about half of the scintillation photons will be directed toward the photodetector (such as SiPM) while the other half will travel a longer distance only to reach the photodetector after being reflected at the top of the crystal. There is a correlation between the initial slope of the photon arrival profile and interaction position (depth). Even accounting for the travel time of the gamma-ray in the scintillator crystal, the transportation delay is about 30 ps/cm for scintillation photons directly detected. Additionally, highly delayed scintillation photons (e.g., back-reflected photons) generally would lead to a secondary peak in the arrival time histogram. These reflected photons arrive too late at the SiPM to contribute to the initial determination of the time-stamp—that is, the moment when the discriminator triggers on the first few (e.g., 1-10) photoelectrons.

In accordance with embodiments, the DOI-dependent initial rising edge of the signal offers the capabilities to quantitatively determine the depth of interaction information and also correct the time variation coming from photon propagation. For a conventional TOF PET detector the capability of DOI determination based on the measurement of arrival time of first photons is severely limited by the relatively slow photosensor(s).

Embodying systems and methods implement an algorithm on next-generation photosensors with the capabilities of time arrival measurements of individual photoelectrons. In accordance with embodiments, two approaches for the arrival time profile estimation can be implemented to reduce the variability in the time estimate by basing the time stamp on characterizing scintillation photon spreading in the first 0.1-0.5 ns.

Embodying DOI correction methods and systems can be applied on digital silicon photomultiplier (dSiPM), multiple-digital silicon photomultiplier (MD-SiPM), etc. For example, a time-to-digital converter (TDC) can be incorporated into each microcell or group of microcells, and the arrival time of the first scintillation photons could be measured independently. Complete time information, in particular the time distribution of photons collected in first 0.5 ns, can be utilized to estimate the depth of interaction. The depth of gamma interaction in the scintillator and corrections of the interaction time measurement could be performed accurately instead of the statistical approach that utilizes assumptions of Poisson arrival statistics.

FIG. 2A depicts pixel structure 210 with reflector 212 at the top of the pixel structure in accordance with some embodiments. Pixel structure 210 includes adjacent pixels Pixel 1, Pixel 2 of a pixel array. As can be understood, the pixel array is not limited to two pixels, nor is the pixel array one-dimensional. For purposes of this discussion, two adjacent pixels of one linear array dimension are depicted.

By sharing scintillation light from individual gamma ray event between adjacent pixels where the scintillator pixels are connected with a back side reflector, embodying methods and systems can determine the difference of scintillation photon transportation inside the crystals. For example, a gamma ray event can occur at depth H1 of Pixel 1, and a second gamma ray event at depth H2. For clarity, the signal at Pixel 1 generated by the gamma ray event at depth H1 will arrive long before the signal at Pixel 2 for the same event. For gamma ray event at depth H2, the time difference between signals generated at Pixel 1 and Pixel 2 will be significantly smaller. A number of scintillation photons can reflect off the reflector at the top of the pixel, and then be detected at Pixel 2. For each gamma ray event, the time delay ΔT between the rising edge of the signal at Pixel 1 and the rising edge of the signal at Pixel 2 can be measured and used to accurately calculate the depth of H1, H2 respectively. FIG. 2A depicts an embodiment with a reflector along the top of the pixel array structure and gap 218 separating scintillation crystals 216A, 216B for the respective pixels.

FIG. 2B depicts pixel structure 220 with modified-shaped crystal surfaces 222, 224 at the top of the pixel structure in accordance with some embodiments. Pixel structure 220 includes gap 228 between adjacent pixels of the pixel array. In this configuration, the modified-shape crystal acts as a prism to deflect scintillation photons into an adjacent pixel. The gap 228 does not extend all the way to the top of shaped crystal 222, 224. Only photons reflected by the shaped crystal surfaces cross to the adjacent crystal. Gap 228 prevents other photons from crossing.

FIG. 3 depicts pixel structure 300 with reflector layer 310 at the top of the pixel in accordance with some embodiments. In this configuration, from the gamma ray event detected at Pixel 1, a number of scintillation photons are reflected off reflector 310 back to the same pixel (Pixel 1) and then detected. As can be seen, without the reflector layer 310 a time delay ΔT1 occurs for the gamma ray event at depth H2. With the reflector introducing an extra time delay, the time delay ΔT2 becomes greater than time delay ΔT1 due to more photon reflection in the reflector layer 310. This increase in the arrival time difference of direct and back-photons makes measurement of rising edge of photon arrival profile more accurate.

Embodying methods estimate the depth of interaction of individual gamma ray events based on the initial photon arrival profile. The timing-stamp can then be corrected when using a leading edge discriminator. Both photon dispersion and Poisson statistics (including timing jitter of SiPM device) need to be taken into consideration. This approach can be implemented on digital silicon photomultiplier (dSiPM), multiple-digital silicon photomultiplier (MD-SiPM), etc. However, embodiments are not so limited and the disclosed approach can be implemented on other design schemes.

There can be two peaks in the arrival time profile of scintillation photons: (1) directly emitted to the SiPM; or (2) emitted to the other end of the crystal and reflected at the crystal surface (top). To strengthen the position dependence of scintillation photon dispersion, the specific-design reflector or modified crystal configuration have been proposed to be applied at the top surface of the crystal. Both the reflector and modified-shaped crystal disclosed above maximize the time delay of photon propagation from the interaction point to the SiPM between direct emission and top reflection. When a certain number of scintillation photons get reflected into a neighboring pixel, and their arrival time is detected separately in both pixels, it is possible to get a more accurate estimate of the timing and depth of interaction of the event by considering both the arrival time(s) and the amplitude(s) of the two pixel signals. An estimation of the depth of interaction can be based on these factors, which in turns allows for a correction of the time stamp. The depth of interaction information can further be incorporated into the reconstruction algorithm, reducing the parallax error commonly encountered in high resolution PET scanners for lines of response that occur when the radiation is incident at an angle to the long axis of the scintillator.

Figure 4:
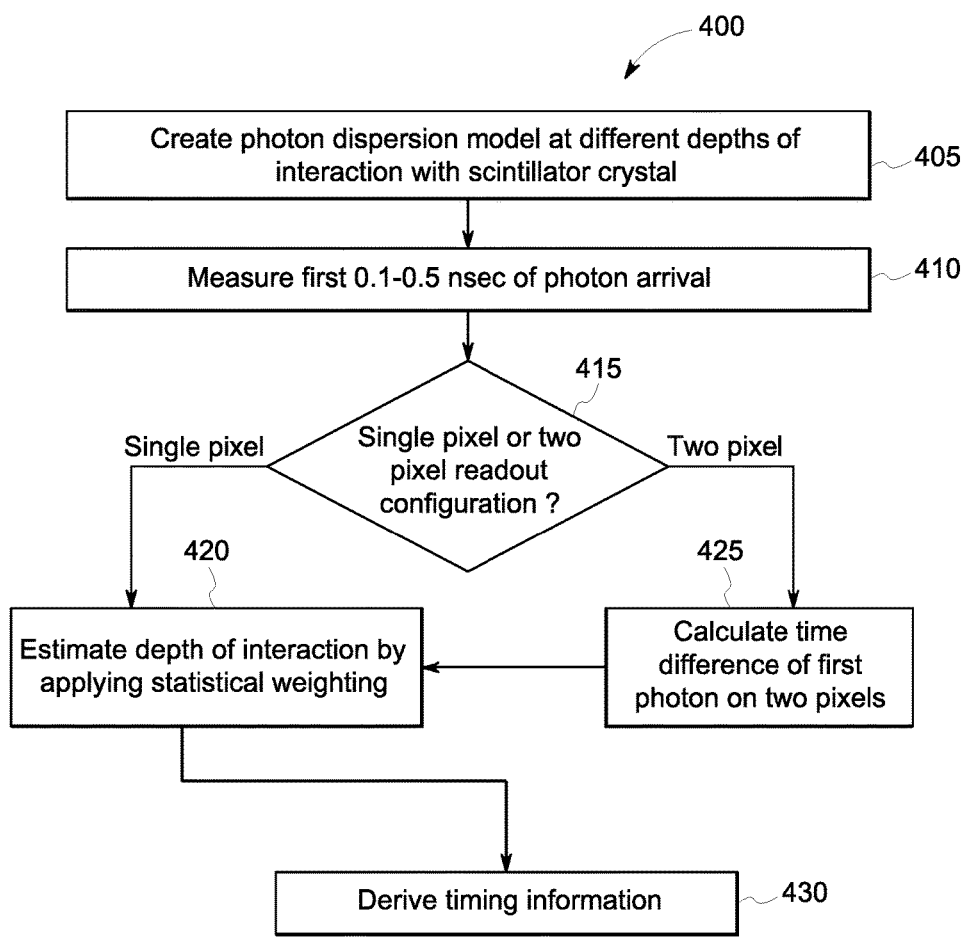
FIG. 4 depicts a process for determining depth of interaction and event timing of a gamma ray in accordance with embodiments.

Embodying systems and methods can measure the arrival time profile of scintillation photons in the first 0.1-0.5 ns of a gamma ray event, where a statistical weighted model is used to determine the depth information to derive the event timing. FIG. 4 depicts process 400 for determining depth of interaction and timing of a gamma ray event in accordance with embodiments. A photon dispersion model is created, step 405. This dispersion model can model photon dispersion at different depths of interaction with the scintillator crystal. The model can be based on the combination of experimental measurements by using a gamma source or an ultra-fast laser and also comprehensive simulations of a detector response function. For example, a detector could be scanned by a gamma-ray source or an ultra-fast laser along the length of the scintillator crystal to determine the scintillation photon dispersion model at different depths.

The first 0.1-0.5 ns arrival profile of scintillation photons generated by an individual gamma ray event is measured, step 410, during a PET scan.

A determination is made as to whether the readout event is from a single pixel or from two pixels, step 415. In accordance with implementations, there can be at least four crystal pixel configurations: (1) a single readout from a standard single crystal; (2) a single readout from a crystal pixel with a reflector layer located at its top (FIG. 3); (3) a two pixel readout where there is a reflector added between adjacent pixels (FIG. 2A), and (4) a two pixel readout where there is modified-shaped surfaces on the top of crystal (FIG. 2B). With the reflector layer located at the top of the scintillation crystal (configuration 2), the arrival time of back-reflected photons would be substantially delayed. This delay associated with the photon being reflected from the top surface reflector provides an improved opportunity to derive the depth-dependent arrival profile. In another implementation, by sharing scintillation photons of individual gamma ray event between adjacent pixels that include a back side reflector (configuration 3) or modified crystal top surface (configuration 4), the difference of photon transportation inside the crystal can be determined.

For single pixel readout (whether a standard single crystal or a crystal with a reflector layer), the depth of interaction is estimated, step 420, by applying a statistical weighting based on the dispersion model (simulated and/or measured) and the measured arrival profile of scintillation photons for each gamma ray event.

For a two pixel readout (configuration 3 and 4), first an arrival time difference of scintillation photons at the two pixels is calculated, step 425. For the two pixel configuration, process 400 then continues to step 420 where the depth of interaction is estimated. The timing information T'=function(T, depth) is derived, step 430, based on the original triggering time corrected with the estimated depth information.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor of the PET system to perform methods discussed herein such as a method for determining the depth-of-interaction correction in a PET imaging system, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for determining depth-of-interaction correction in a positron emission tomography (PET) system, the method comprising:
modifying a scintillator crystal and readout electronic configuration to maximize a time delay of propagation of scintillation photons within a scintillator crystal of the PET system and thereby to improve a depth-dependent arrival profile of scintillation photons in at least one of a single crystal and optically-coupled multiple crystals;
creating a scintillation photon dispersion model of a gamma ray interaction event within the scintillator crystal of the PET system;
measuring a photon arrival profile of the gamma ray event in the scintillator crystal;
deriving an estimated depth-of-interaction; and
deriving a time of the gamma ray event based on a time stamp corrected with the estimated depth-of-interaction, the time stamp based on characterizing scintillation photons spreading in the first 0.1-0.5 ns and provided by a timing validation circuit.

2. The method of claim 1, the modifying step including adding a reflector layer at a top of the crystal, the reflector layer delaying back-reflected photons for the single crystal, or optically coupling the multiple crystals.

3. The method of claim 1, including the photon dispersion model including modeling dispersion at different depths of interaction within the scintillator crystal, wherein the model is based on at least one of experimental measurements and simulation results of response functions.

4. The method of claim 3, including obtaining the experimental measurements by scanning along a length of the scintillator crystal with one of a radioactive source and an ultra-fast light source.

5. The method of claim 3, including creating detector response function by simulating at least one of scintillation photon detection behavior for photon generation and propagation, detector efficiency, and timing jitter of a photosensor.

6. The method of claim 1, including determining the arrival profile of scintillation photons within 0.1-0.5 nanoseconds of an individual gamma ray event.

7. The method of claim 1, including providing a readout from two pixels that are optically coupled by a back side reflector or a modified crystal configuration.

8. The method of claim 7, including:
calculating a time difference of the scintillation photon arrival at the two pixels; and
estimating the depth-of-interaction by applying a statistical weighting based on the scintillation photon dispersion model.

9. The method of claim 1, including providing two respective readouts for the same gamma ray event from two respective pixels that are optically coupled by a back side reflector or a modified crystal configuration.

10. The method of claim 1, including improving at least one of a timing resolution and a spatial resolution of the PET system with the depth-of-interaction correction.

11. A non-transitory computer-readable medium having stored thereon instructions which when executed by a processor of a positron emission tomography (PET) system cause the processor to perform a method of determining depth-of-interaction correction in the PET system, the method comprising:
modifying a scintillator crystal and readout electronic configuration to maximize a time delay of propagation of scintillation photons within a scintillator crystal of the PET system and thereby to improve a depth-dependent arrival profile of scintillation photons in at least one of a single crystal and optically-coupled multiple crystals;
creating a scintillation photon dispersion model of a gamma ray interaction event within the scintillator crystal of the PET system;
measuring a photon arrival profile of the gamma ray event in the scintillator crystal;
deriving an estimated depth-of-interaction; and
deriving a time of the gamma ray event based on a time stamp corrected with the estimated depth-of-interaction, the time stamp based on characterizing scintillation photons spreading in the first 0.1-0.5 ns and provided by a timing validation circuit.

12. The non-transitory computer-readable medium of claim 11, including instructions to cause the processor to perform the photon dispersion model by including modeling dispersion at different depths of interaction within the scintillator crystal.

13. The non-transitory computer-readable medium of claim 11, including instructions to cause the processor to base the photon dispersion model on at least one of experimental measurements and simulation results of response functions.

14. The non-transitory computer-readable medium of claim 13, including instructions to cause the processor to obtain the experimental results by acquiring data from scanning along a length of the scintillator crystal with one of a radioactive source and an ultra-fast light source.

15. The non-transitory computer-readable medium of claim 11, including instructions to cause the processor to determine the arrival dispersion of scintillation photons arriving within 0.1-0.5 nanoseconds of the individual gamma ray event.

16. The non-transitory computer-readable medium of claim 11, including instructions to cause the processor to perform the measuring step with a readout from two pixels that are optically coupled by a back side reflector or modified crystal configuration.

17. The non-transitory computer-readable medium of claim 16, including instructions to cause the processor to perform the measuring step with two respective readouts for the same gamma ray event from two respective pixels that are optically coupled by a back side reflector or modified crystal configuration.

18. The non-transitory computer-readable medium of claim 16, including instructions to cause the processor to:
calculate a time difference of the photon arrival at the two pixels; and
estimate the depth-of-interaction by applying a statistical weighting based on the photon dispersion model.

19. The non-transitory computer-readable medium of claim 11, including instructions to cause the processor to correct parallax error and improve spatial resolution in an image reconstruction of the PET system using the depth-of-interaction correction.

* * * * *